(12) United States Patent
Sano

(10) Patent No.: US 9,746,619 B2
(45) Date of Patent: Aug. 29, 2017

(54) OPTICAL FIBER ATTACHMENT DEVICE, AND PHOTOELECTRIC CONVERSION DEVICE USING SAME

(71) Applicant: HIROSE ELECTRIC CO., LTD., Tokyo (JP)

(72) Inventor: Yoshiaki Sano, Tokyo (JP)

(73) Assignee: HIROSE ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/091,744

(22) Filed: Apr. 6, 2016

(65) Prior Publication Data

US 2016/0299296 A1   Oct. 13, 2016

(30) Foreign Application Priority Data

Apr. 10, 2015 (JP) .................................. 2015-080794

(51) Int. Cl.
*G02B 6/38* (2006.01)
*G02B 6/42* (2006.01)

(52) U.S. Cl.
CPC ........... *G02B 6/3838* (2013.01); *G02B 6/387* (2013.01); *G02B 6/3822* (2013.01); *G02B 6/3858* (2013.01); *G02B 6/4292* (2013.01); *G02B 6/4295* (2013.01)

(58) Field of Classification Search
CPC .. G02B 6/3838; G02B 6/3822; G02B 6/3858; G02B 6/387; G02B 6/4292; G02B 6/4295; G02B 6/42; G02B 6/4201; G02B 6/4219; G02B 6/4228; G02B 6/423; G02B 6/4236; G02B 6/424; G02B 6/4245; G02B 6/4256
See application file for complete search history.

(56) References Cited

U.S. PATENT DOCUMENTS 7,572,065 B2 * 8/2009 Lu ........................ G02B 6/3816
     385/55
8,573,862 B2 * 11/2013 McColloch .......... G02B 6/4246
     385/92

FOREIGN PATENT DOCUMENTS

JP      2012177732      9/2012
JP      5331837         8/2013

\* cited by examiner

*Primary Examiner* — John M Bedtelyon
(74) *Attorney, Agent, or Firm* — Procopio, Cory, Hargreaves & Savitch LLP

(57) ABSTRACT

An optical fiber attachment device has a slide receptacle having a slide space, and a sliding member provided slidably in the slide space. The sliding member has an installation component where the core wire of an optical fiber is held by a fiber holder, a pressure contact part is provided to the slide face of the slide receptacle in the slide space, and a corresponding pressure contact part is provided to the slide face of the sliding member in the slide space, and when the sliding member has slid in the slide space, the pressing force of the pressure contact part propagates through the corresponding pressure contact part to the sliding member side, and part of the sliding member is pressed from the slide receptacle side toward the installation component on the sliding member side.

12 Claims, 16 Drawing Sheets

OPTICAL FIBER ATTACHMENT DEVICE, AND PHOTOELECTRIC CONVERSION DEVICE USING SAME

The present application claims the benefit of foreign priority under 35 USC §119 based Japanese Patent Application No. 2015-080794, filed Apr. 10, 2015, the contents of which is incorporated herein in its entirety by reference.

BACKGROUND

1. Technical Field

The present invention relates to an optical fiber attachment device, and more particularly to an optical fiber attachment device etc., with which an optical fiber can be mechanically attached to a connector.

2. Related Art

With a conventional optical connector, an adhesive is generally used to attach the optical fiber to a connector. When an adhesive is used, however, depending on the type of adhesive, it can take a long time for the adhesive to cure, and a UV-setting adhesive, for example, entails the work of irradiating with UV rays, etc., making the task more complicated. Furthermore, when an adhesive is used, the worker needs to be experienced, and another problem is inconsistent quality.

PRIOR ART DOCUMENTS

Patent Documents

Patent Document 1: Japanese Patent No. 5,331,837

SUMMARY

Problems to be Solved by the Invention

The present invention was conceived in an effort to solve the problems encountered with the above-mentioned prior art, and it is an object thereof to make it possible to mechanically attach an optical fiber to a connector without the use of an adhesive, so as to make the task of attaching the optical fiber more efficient.

Means for Solving the Problems

An optical fiber attachment device according to a mode of the present invention, comprises: a slide receptacle having a slide space; and a sliding member provided slidably in the slide space; wherein the sliding member has an installation component where the core wire of an optical fiber is installed, a pressure contact part is provided to the slide face of the slide receptacle in the slide space, and a corresponding pressure contact part is provided to the slide face of the sliding member in the slide space, and when the sliding member has slid in the slide space, the pressing force of the pressure contact part propagates through the corresponding pressure contact part to the sliding member side, and part of the sliding member is pressed from the slide receptacle side toward the installation component on the sliding member side.

In this embodiment, an optical fiber, and particularly the core wire thereof, can be mechanically attached without the use of an adhesive, merely by sliding a slide member in a slide space, and this makes the task of attaching the optical fiber more efficient.

With the optical fiber attachment device in the above mode, the pressure contact part is formed by utilizing a protruding component that protrudes from the slide face of the slide receptacle in the slide space toward the slide face of the sliding member, and the corresponding pressure contact part is formed by utilizing a recessed component that is recessed from the slide face of the slide receptacle in the slide space toward the slide face of the sliding member, or the pressure contact part is formed by utilizing a recessed component that is recessed from the slide face of the slide member in the slide space toward the slide face of the slide receptacle, and the corresponding pressure contact part is formed by utilizing a protruding component that protrudes from the slide face of the slide member in the slide space toward the slide face of the slide receptacle.

With the optical fiber attachment device in the above mode, a sloped face is provided to the contact face of the protruding component and the recessed component of the protruding component and/or the recessed component in order to make said contact face more gentle.

Providing a slope reduces the load exerted during sliding of the sliding member in the slide space.

With the optical fiber attachment device in the above mode, the sliding member has a main body part and a pressing part provided in a movable state to said main body part, and the installation component is provided between the main body part and the pressing part.

Furthermore, with the optical fiber attachment device in the above mode, the main body part and the pressing part may be linked together or may be separated from one another.

Linking them together makes it easier to handle them.

Also, with the optical fiber attachment device in the above mode, the slide receptacle may be in the form of a tube with or without a bottom.

The slide receptacle need not be in the form of a tube, and furthermore it is sufficient if it allows the sliding member to be slid, so it does not necessarily need to have a bottom, and may be bottomless.

Furthermore, with the optical fiber attachment device in the above mode, the slide receptacle may be a metal shell.

Using a metal shell as the slide receptacle ensures that adequate strength and also provides an electrical shielding effect.

With the optical fiber attachment device in the above mode, a fiber holder has a base and a cover that covers this base, and a core wire holder that holds the core wire of the optical fiber between the base and the cover, and, a cover holder that holds the cover of the optical fiber including the core wire are provided along the axial direction of the optical fiber between the base and the cover.

When this configuration is employed, an optical fiber can be mechanically attached by simply assembling the base and the cover without the use of an adhesive, and the task of attaching the optical fiber can be made more efficient.

Also, with the optical fiber attachment device in the above mode, the base and the cover may be linked together or separated from one another.

Linking the base and cover together makes it easier to handle.

Also, with the optical fiber attachment device in the above mode, the cover holder may be provided on the face of the cover opposite the base, and may include a V groove that widens on the side closer to the base.

When a V groove is provided, as the cover is moved closer to the base, the V groove can bite into the cover of the optical fiber, allowing the covered portion of the optical fiber to be held more securely and smoothly.

Also, with the optical fiber attachment device in the above mode, the core wire holder may include a flat part provided on the face of the cover opposite the base.

When the cover pressed against the base is a flat part, it is possible to reduce the likelihood of damage to the brittle core wire.

Also, with the optical fiber attachment device in the above mode, at least part of the cover may be housed in the slide space of the slide receptacle.

When the cover is housed in the slide space, the walls of the slide receptacle constituting the slide space can be used as a cover retainer.

Also, a fiber holder that holds the core wire of the optical fiber may be provided to the optical fiber attachment device in the above mode to constitute an optical fiber connector.

Furthermore, the optical fiber attachment device or optical fiber connector in the above modes may be a photoelectric conversion connector, and a mode of the present invention provides a photoelectric conversion device that includes a photoelectric conversion connector and an electrical connector that is connected to said photoelectric conversion connector.

Effects of the Invention

The present invention makes it possible to mechanically attach an optical fiber to a connector without the use of an adhesive, and to make the task of attaching the optical fiber more efficient.

DETAILED DESCRIPTION

The optical fiber attachment device pertaining to a preferred embodiment of the present invention will now be described through reference to the appended drawings. An example of an application to a photoelectric conversion connector will be described here, but this is nothing but an example, and the optical fiber attachment device of the present invention should not, of course, be construed as being limited to the application to a photoelectric conversion connector.

Figure 1:
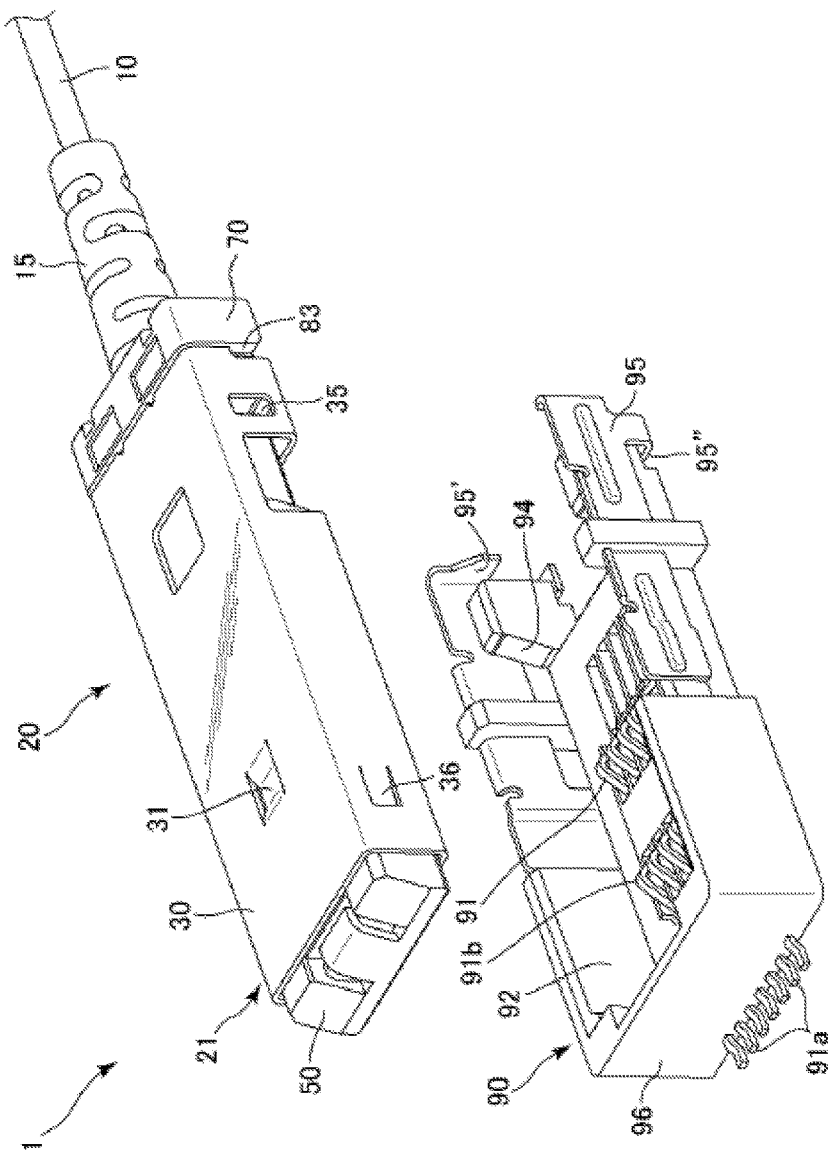
FIG. 1 An oblique view of the photoelectric conversion device pertaining to an embodiment of the present invention.

FIG. 1 is an oblique view of a photoelectric conversion connector 20 (the optical fiber attachment device pertaining to an embodiment of the present invention) and an electrical connector 90 (the mating connector). The photoelectric conversion connector 20 can be mated with this electrical connector 90 to constitute a photoelectric conversion device 1. During this mating, communication can be performed using both electrical and optical signals between the photoelectric conversion connector 20 and the electrical connector 90.

The photoelectric conversion connector 20 includes a device main body 21 and a fiber holder 70 that can be attached to and removed from the device main body 21. Whether or not to provide the fiber holder 70 is optional, but if the fiber holder 70 is provided, optical fiber attachment is possible, and in this case the photoelectric conversion connector 20 is used as an optical fiber connector. The device main body 21 further includes a metal shell 30 and a photoelectric conversion module 50 that can be housed in this shell 30. Since the shell 30 is made of metal, it has good strength, and it also functions as an electrical shield. When the photoelectric conversion connector 20 is mated with the electrical connector 90, an optical fiber 10 is held not only by the fiber holder 70, but also by the device main body 21.

The electrical connector 90 includes a housing 96 formed from resin or another such insulating material, terminals 91 provided on the bottom of this housing 96, and latching locks 95 provided along the left and right walls on the rear end side of this housing 96.

A mating cavity 92 for mating with the photoelectric conversion connector 20 is formed in the middle of the housing 96. The terminals 91 and the latching locks 95 are formed from metal or another such conductive material, and are fixed by being molded integrally with the housing 96. One end of the terminals 91 is formed as connection components 91a that are fixed to a substrate (not shown), and the other end is formed as contact components 91b that project upward in a peaked shape.

The side walls on the rear end side of the latching locks 95 are bent inward toward the mating cavity 92, and are thereby formed as latching tabs 95' having an elastic action. When the mating cavity 92 is used to mate the photoelectric conversion connector 20 with the electrical connector 90, the latching tabs 95' of the electrical connector 90 fit into latching holes 35 provided on the left and right side walls of the shell 30 of the photoelectric conversion connector 20, allowing the photoelectric conversion connector 20 to be latched to the electrical connector 90. Contact parts 95" that extend toward a substrate (not shown) are formed on the side walls on the rear end side of the latching locks 95, and come into contact with the lower face on the rear end side of the housing 96 when the latching tabs 95' and the latching holes 35 are disconnected, which prevents the permanent set of the latching tabs 95'.

Figure 2:
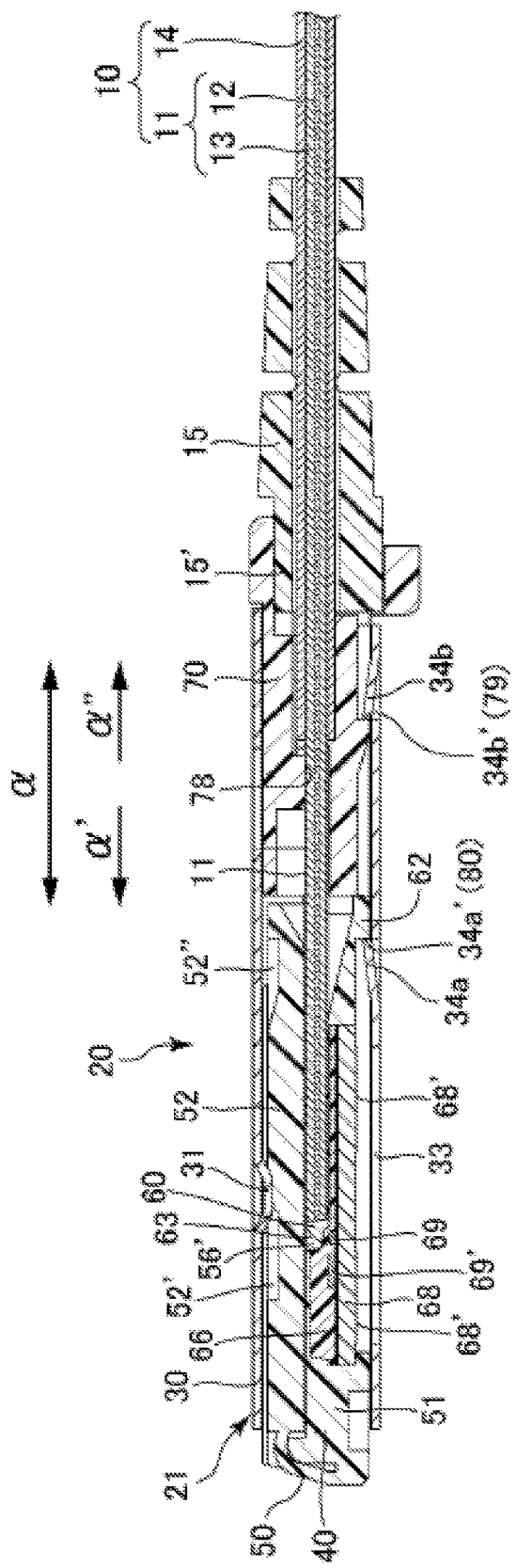
FIG. 2 A center line cross section of before a photoelectric conversion connector and an electrical connector have been mated.
Figure 3:
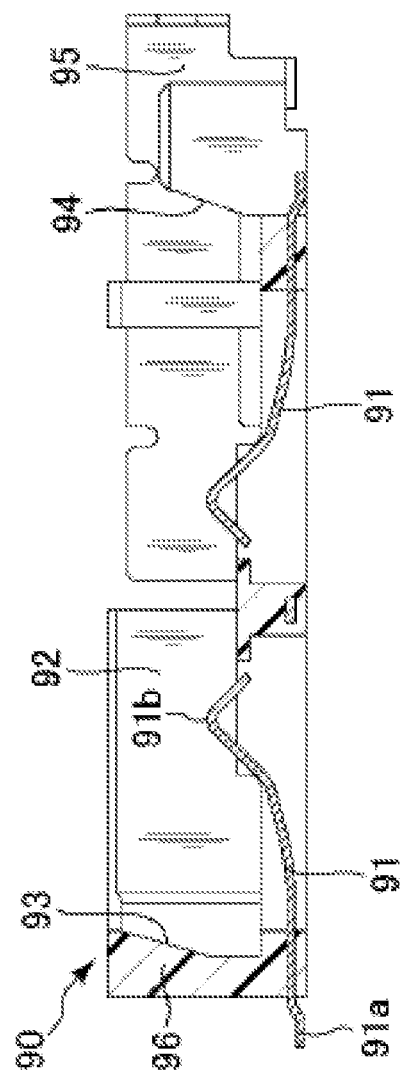
FIG. 3 A center line cross section of after a photoelectric conversion connector and an electrical connector have been mated.

FIG. 2 is a center line cross section of the photoelectric conversion connector 20 and the electrical connector 90 before the photoelectric conversion connector 20 and the electrical connector 90 have been mated, while FIG. 3 is a center line cross section of after these have been mated. Front guide faces 93 are provided to the front inner wall of the mating cavity 92, and rear guide faces 94 are provided to the rear inner wall, so that the photoelectric conversion connector 20 will be smoothly guided into the mating cavity 92.

The optical fiber 10 is the same as those that are typically used, however a multimode fiber is preferable. The material may be plastic or quartz. A core wire 11 composed of a core 12 and cladding 13 is formed in the center of the optical fiber 10, and a cover 14 is formed around the outside of the core wire 11. A boot 15 that reinforces the optical fiber 10 may be attached to the rear end part of the optical fiber 10.

Conversion between optical and electrical signals is performed by a photoelectric conversion element 69 provided to the photoelectric conversion connector 20. The photoelectric conversion element 69 referred to here encompasses both a light receiving element (such as a photodiode (PD)) serving as an optical semiconductor element for converting optical signals into electrical signals, and a surface emitting type of light emitting element (such as a vertical cavity surface emitting laser (VCSEL)) serving as an optical semiconductor element. The optical semiconductor element referred to here encompasses, for example, LEDs, semiconductor lasers, photodiodes, and the like. A light receiving element or a light emitting element may be used as dictated by the situation.

Communication through electrical signals is performed through contact between the contact components 91b of the terminals 91 of the electrical connector 90 and terminal contacts 68' exposed on the bottom of the photoelectric conversion connector 20. Electrical signals transmitted to the terminal contacts 68' are converted into optical signals through the photoelectric conversion element 69, after which a mirror 63 of a reflector 60 provided to the photoelectric conversion connector 20 is used to reflect the light and transmit it to the optical fiber 10.

Conversely, the mirror 63 of the reflector 60 is used to reflect optical signals from the optical fiber 10 to the photoelectric conversion element 69, after which they are converted into electrical signals through the photoelectric conversion element 69, and are thereby transmitted to the substrate through contact between the terminal contacts 68' and the contact components 91b. Communication through electrical signals between the optical fiber 10 and the substrate is performed by this method.

Figure 4:
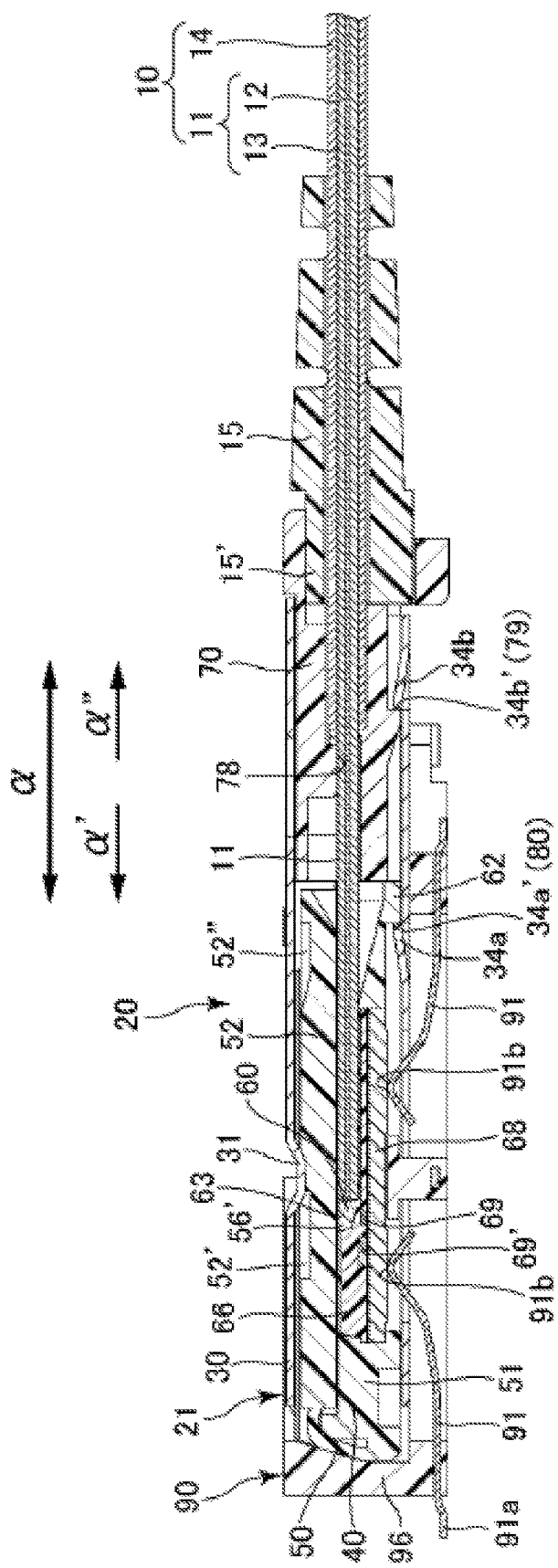
FIG. 4 An exploded oblique view of a photoelectric conversion connector.

FIG. 4 is an exploded oblique view of the photoelectric conversion connector 20.

As shown in this drawing, the photoelectric conversion connector 20 includes the fiber holder 70 and the device main body 21, which includes the shell 30 and the photoelectric conversion module 50. The configuration of these members will now be described in detail through reference to FIG. 4 and other drawings.
<Shell>

Figure 5:
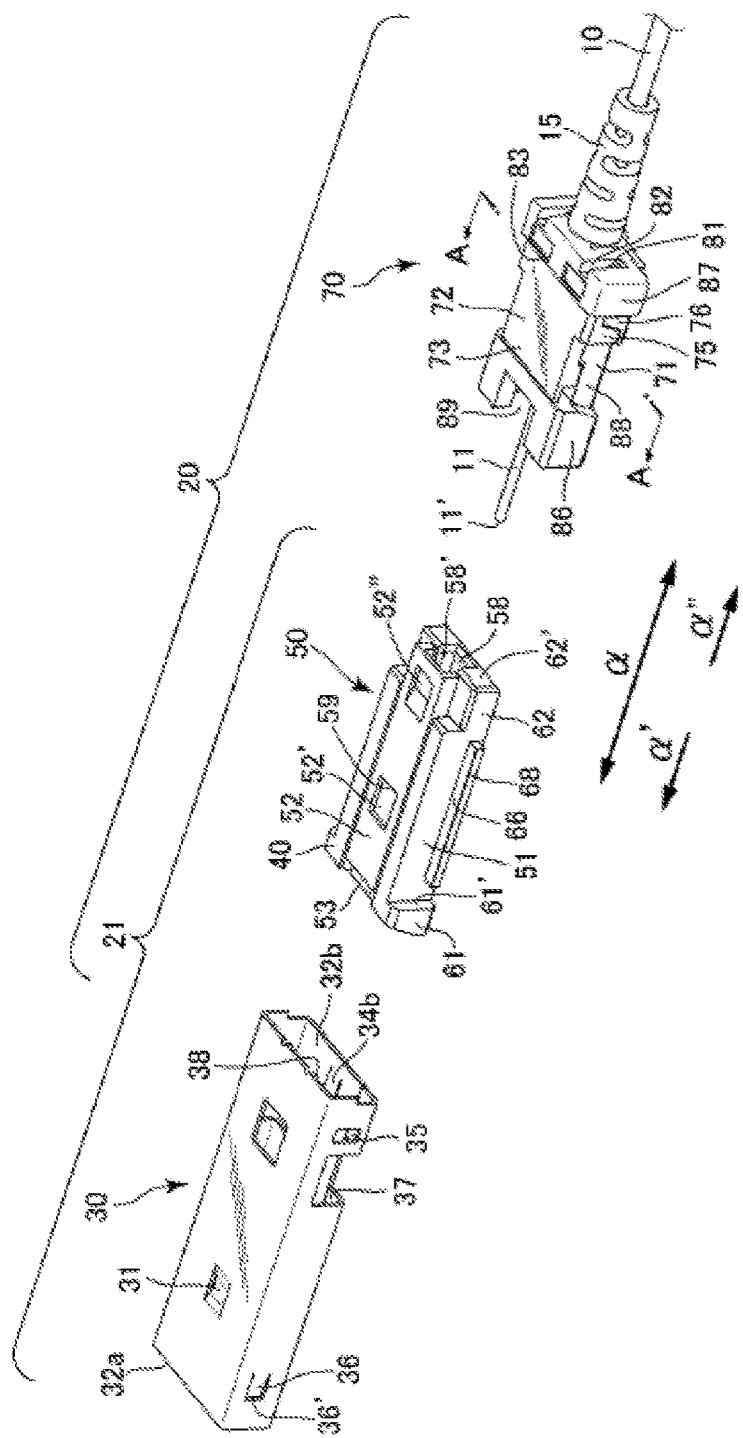
FIG. 5 An oblique view of the bottom face of the shell shown in FIG. 4.

FIG. 5, like FIGS. 1 and 4, is an oblique view of the bottom face of the shell 30.

The shell 30 is formed as a tube having a rectangular cross section. Here, it has no bottom, or to put this more clearly, it is open through openings 32a and 32b provided on the front and rear sides in the axial direction α of the optical fiber 10.

A space 37 formed in the interior of the shell 30 is utilized as a slide space 37 into which the photoelectric conversion module 50 is slid. Thus, the shell 30 can function as a slide receptacle for sliding the photoelectric conversion module 50, which is a sliding member.

The slide space 37 can also function as an insertion space into which part of the fiber holder 70 is inserted. Part of the fiber holder 70 or the photoelectric conversion module 50 is inserted through the rear opening 32b into the slide space 37.

The shell 30 (serving as the slide receptacle) does not necessarily have to be tubular for the entirety of the shell, so long as the photoelectric conversion module 50 can be slid. For instance, a tubular portion may be provided to part of the shell to create the slide space 37. Also, the cross section of the shell 30 does not necessarily have to be rectangular. Furthermore, the shell does not necessarily have to be bottomless, and may instead have a bottom. More precisely, the opening 32a provided on the front side along the axial direction α of the optical fiber 10 may be closed off.

A relatively large hole 33 provided in the bottom wall of the shell 30 is used to connect the contact components 91b of the electrical connector 90 to the terminal contacts 68' of the photoelectric conversion connector 20.

A protruding component 31 (also referred to here as the "pressure contact part") that protrudes from the slide face of the shell 30 in the slide space 37 toward the slide face of the photoelectric conversion module 50 is provided to the upper wall of the shell 30. The protruding component 31 is formed here by punching the shell 30 toward the slide space 37 side. It does not necessarily have to be formed by punching, however, and a separate member (not shown) may be fixed, for example, and made to protrude toward the slide space 37 side just as the protruding component 31 does. When the photoelectric conversion module 50 slides in the slide space 37, the protruding component 31 come into contact with a corresponding pressure contact part (59) provided at a corresponding position of the photoelectric conversion module 50, and this contact displaces part of the photoelectric conversion module 50 (a pressing part 52) from the shell 30 side to the photoelectric conversion module 50 side. As a result, the pressing force of the protruding component 31 propagates through the corresponding pressure contact part 59 to the photoelectric conversion module 50 side, and part of the photoelectric conversion module 50 is pressed from the shell 30 side toward the photoelectric conversion module 50 side. As long as the configuration is such that part of the photoelectric conversion module 50 (the pressing part 52) produces or increases a pressing force from the shell 30 side toward the photoelectric conversion module 50 side, a part of the photoelectric conversion module 50 (the pressing part 52) does not necessarily have to be displaced from the shell 30 side to the photoelectric conversion module 50 side.

Lances 36 for fixing the position of the photoelectric conversion module 50 in the slide space 37 are provided on the front side of the left and right side walls of the shell 30. The lances 36 are formed by cutting a three-sided rectangle into the side walls of the shell 30, and bending the free end 36' produced by this cutting into the interior of the shell 30. Because the lances 36 are provided, the free ends 36' of the lances 36 butt up against flanges 61' provided on the front end sides 61 of the photoelectric conversion module 50, which restricts movement of the photoelectric conversion module 50 in the slide space 37 in the opposite direction α" from the slide direction α' of the photoelectric conversion module 50.

Lances 34a and 34b that are similar to the lances 36 are also provided to the bottom wall of the shell 30. The lances 34a and 34b are respectively provided on the front and rear sides in the axial direction α of the optical fiber 10.

The front lance 34a is similar to the lances 36 in that it is used to fix the position of the photoelectric conversion module 50 in the slide space 37. However, unlike the lances 36, the lance 34a is used to restrict the movement of the photoelectric conversion module 50 in the slide space 37 in the slide direction α'. As is clear from FIGS. 2 and 3, when the photoelectric conversion module 50 tries to move in the slide space 37 in the slide direction α', the free end 34a' of the lance 34a can butt up against a lance latching component 80 (also shown in an oblique view in FIG. 10, as discussed below) formed on the bottom face of the rear end part 62 of the photoelectric conversion module 50. Thus, the action of the lance 34a and the lances 36 completely restricts the movement of the photoelectric conversion module 50 in the slide space 37 in the slide direction α' and in the opposite direction α", and positions the photoelectric conversion module 50 within the slide space 37.

Meanwhile, the rear lance 34b differs from the lance 34a and the lances 36 in that it is used to restrict the movement of the fiber holder 70 in the slide space 37. As is clear from FIGS. 2 and 3, when the fiber holder 70 tries to move in the slide space 37 in the opposite direction α" from the slide direction α', the free end 34b' of the lance 34b can butt up against a lance latching component 79 (also shown in an oblique view in FIG. 11b, as discussed below) formed on the bottom face of the fiber holder 70. Since movement of the fiber holder 70 in the slide direction α' is restricted by the photoelectric conversion module 50, the fiber holder 70 is similar to the photoelectric conversion module 50 in that its movement in the slide space 37 is completely restricted in the slide direction α' and in the opposite direction α", and the fiber holder 70 is positioned within the slide space 37 in the same manner as the photoelectric conversion module 50.

<Photoelectric Conversion Module>

Figure 6:
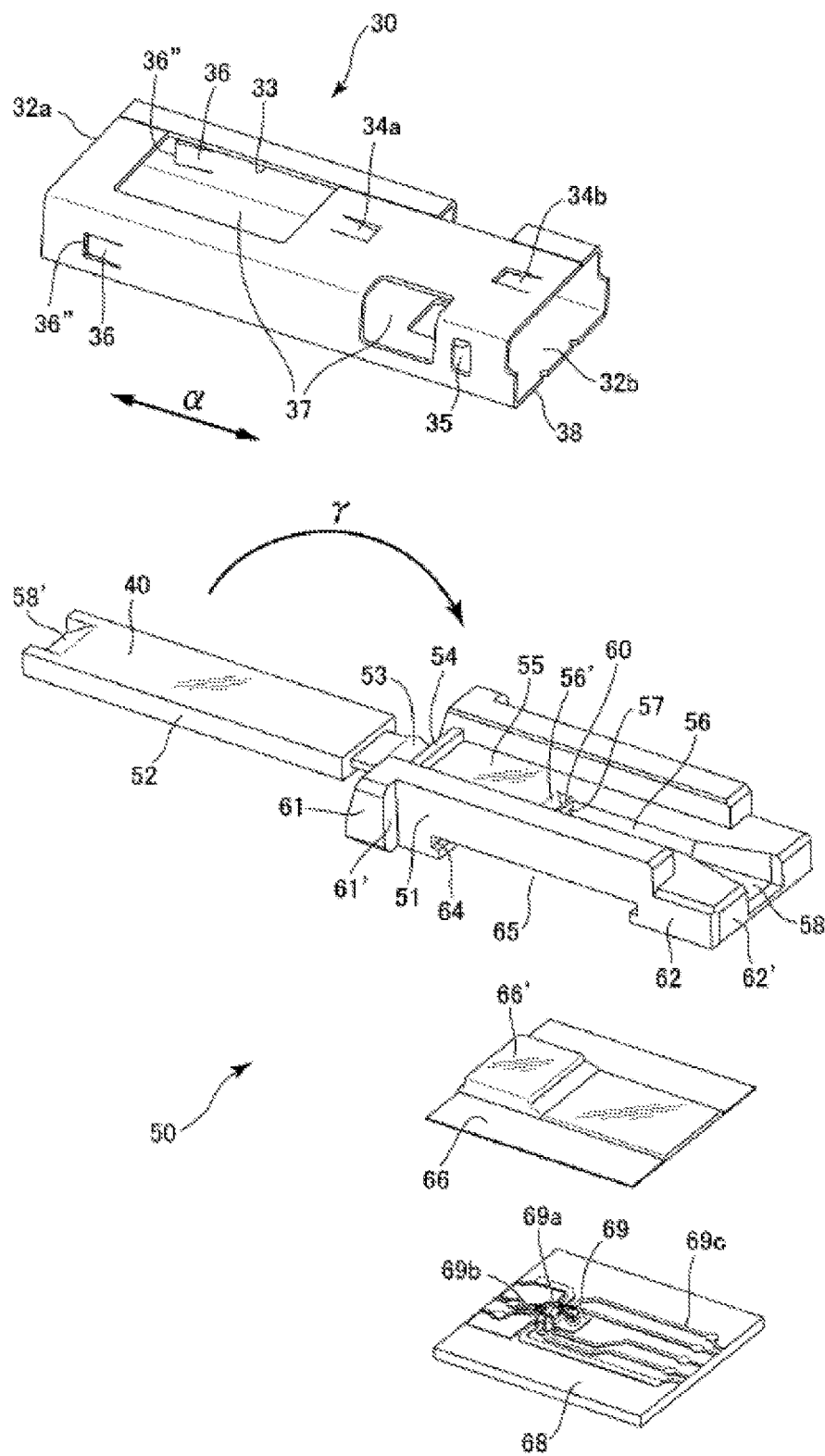
FIG. 6 An exploded oblique view of a photoelectric conversion module.

FIG. 6, like FIGS. 1 and 4, is an exploded oblique view of photoelectric conversion module 50. The photoelectric conversion module 50 has a housing 40 that includes a main body part 51 and the pressing part 52, a substrate-shaped support 68 that is attached to the main body part 51 of the housing 40, and a resin member 66 that covers the support 68. Pads used for terminal contacts are provided to the substrate-shaped support 68. The main body part 51 and the pressing part 52 are linked together by a hinge 53. This hinge 53 is used so that the pressing part 52 can be folded in the arrow γ direction with respect to the main body part 51 without separating from the main body part 51. FIG. 6 shows the state before the pressing part 52 is folded over the main body part 51, but FIG. 4 shows the state after the pressing part 52 has been folded over the main body part 51.

Figure 7:
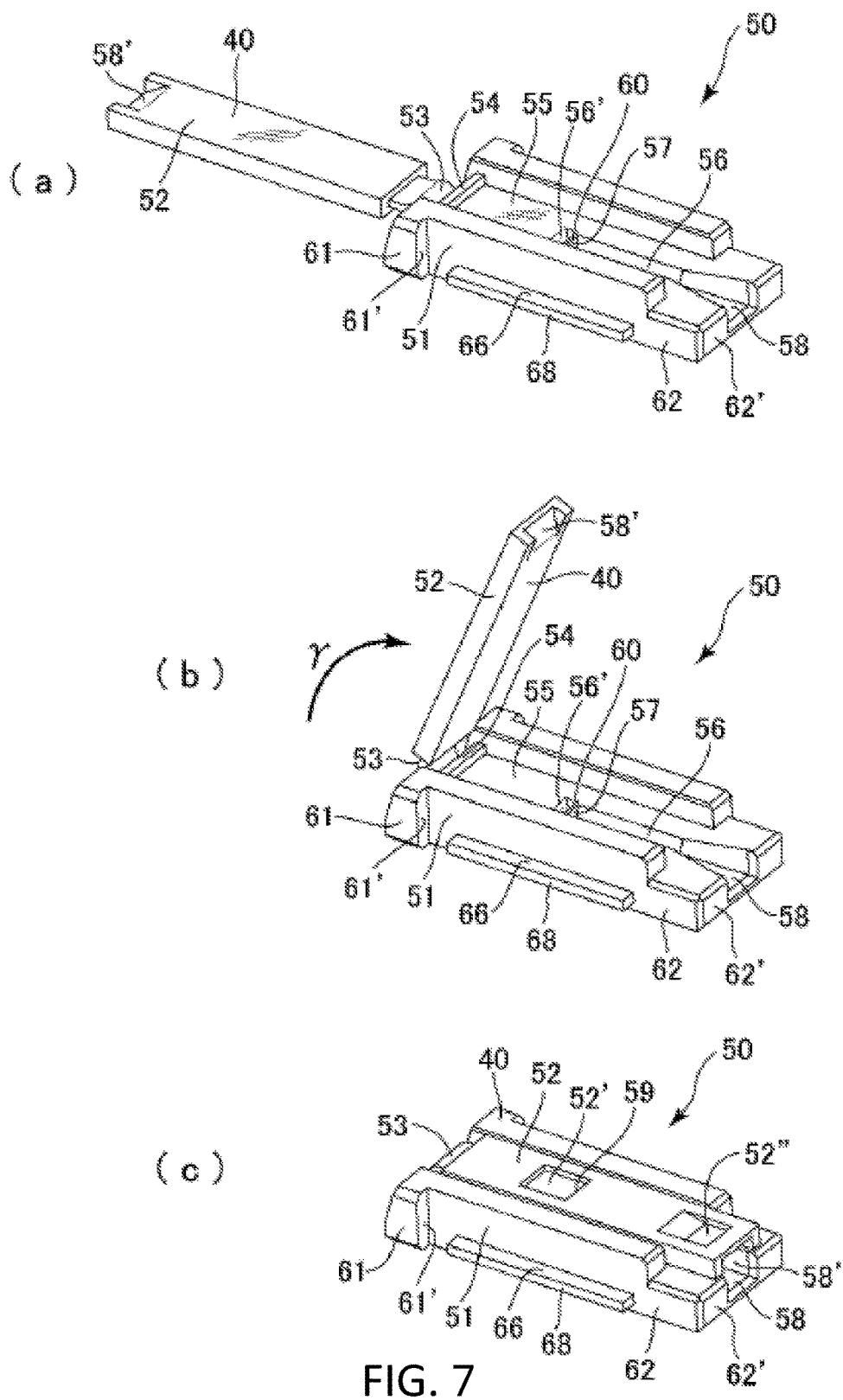
FIG. 7 Oblique views showing the detailed operation of folding the pressing part over the main body part.
Figure 8:
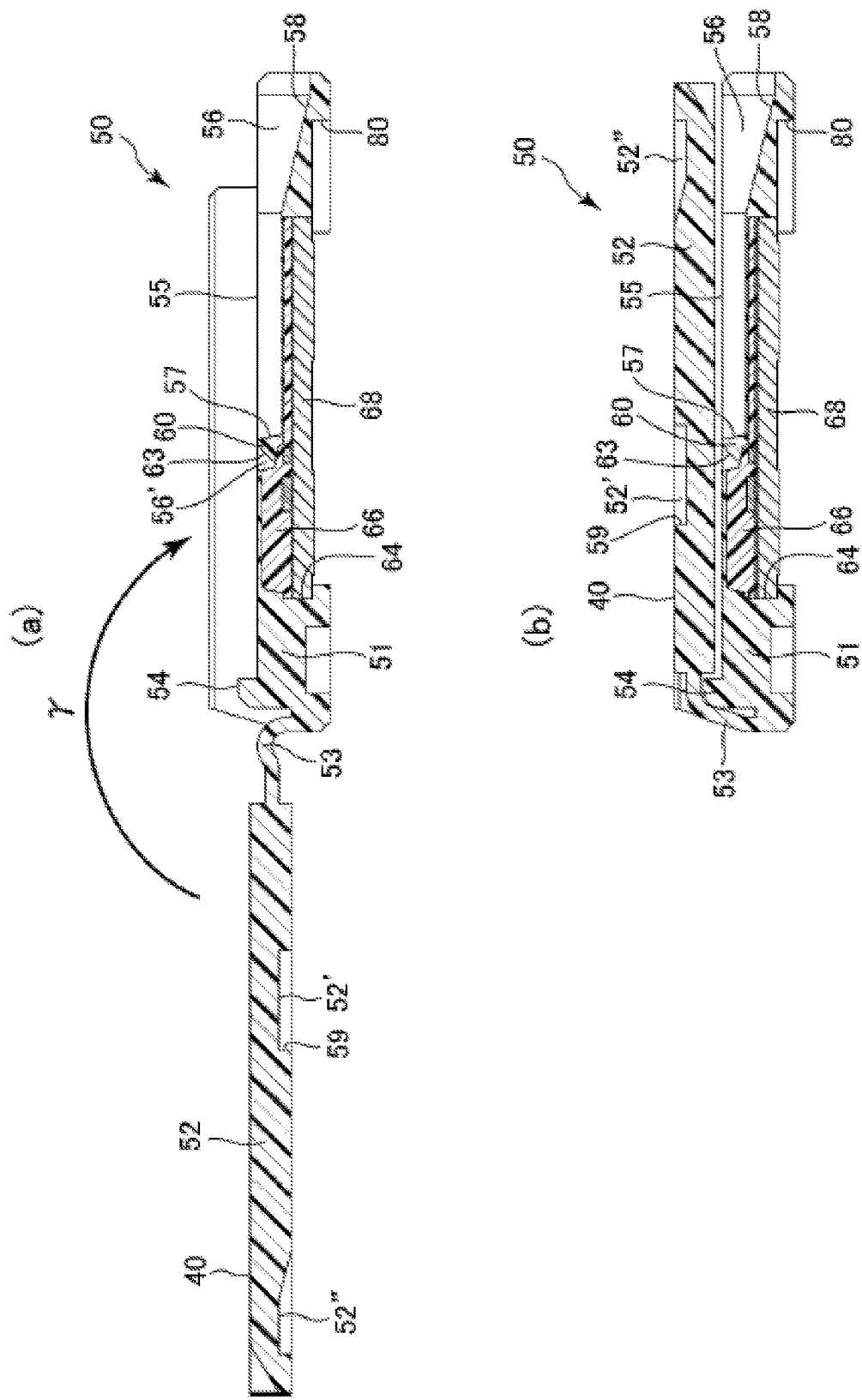
FIG. 8 Center cross sections corresponding to FIGS. 7a and 7b.

FIGS. 7a through 7c are oblique views showing in detail the operation by which the hinge 53 is used to fold the pressing part 52 over the main body part 51. FIGS. 8a and 8b are center cross sections corresponding to FIGS. 7a and 7c. A raised part 54 is provided at the front side of the main body part 51 corresponding to the folding position of the hinge 53. The hinge 53 folds in the γ direction in a state of being butted up against the raised part 54. The elasticity of the hinge 53 exerts a force that tries to return it to its state prior to folding, and even after folding, the pressing part 52 can be held in a state of floating somewhat away from the main body part 51, and in a state of having elasticity in the up and down direction.

A positioning groove (installation component) 56 for installing the core wire 11 of the optical fiber 10 is provided on the upper face of the main body part 51, or in other words, in between the main body part 51 and the pressing part 52. The side of the positioning groove 56 where the core wire 11 is inserted is preferably flared out to make it easier to insert the core wire 11. For the same reason, a guide taper 58 that gently slopes toward the very back of the positioning groove 56 is provided to the positioning groove 56, and a similar taper 58' is also correspondingly provided to the corresponding position of the pressing part 52. A boundary face 57 of the reflector 60, which is substantially triangular in side view and is formed by providing a depression 56' to the housing 40, is provided at the very back of the positioning groove 56 in a state that can accommodate the distal end 11' of the core wire 11.

The main body part 51 is formed by integrally molding the support 68 covered by the resin member 66 from a different resin. In addition to the photoelectric conversion element 69, also mounted on the support 68 are a drive device 69a for driving the photoelectric conversion element 69, wire-bonding wiring 69b that connects the photoelectric conversion element 69 to the drive device 69a and so forth, and other wiring 69c. These are preferably protected by the resin member 66, and it is particularly favorable for the photoelectric conversion element 69, the drive device 69a, and the wire-bonding wiring 69b to be sealed with a sealant 66'. If the photoelectric conversion element 69 is a light receiving element, then the drive device 69a referred to here includes a transimpedance amplifier/limiting amplifier (TIA/LA), for example, and if the photoelectric conversion element 69 is a light emitting element, then the drive device 69a includes a VCSEL driver, for example. In any case, the drive device 69a can be electrically connected to the terminal contacts 68'. A gap 64 for attaching the support 68 is provided on the bottom side of the main body part 51. The support 68 covered by the resin member 66 may be held on the bottom of the main body part 51 by inserting the support 68 into the gap 64 in the side face direction.

Figure 9:
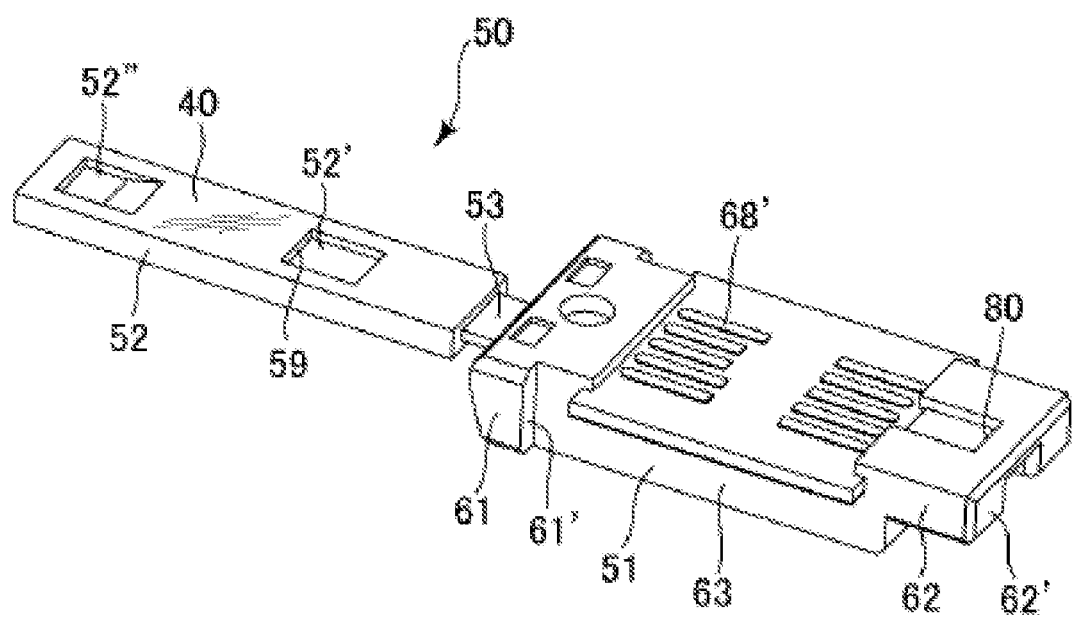
FIG. 9 An oblique view of the bottom face of a photoelectric conversion module.

FIG. 9 shows an oblique view of the bottom face of the photoelectric conversion module 50. The terminal contacts 68', which are connected to the other wiring 69c by vias, are provided in an exposed state on the bottom face of the support 68. A recessed component 52', which is recessed in the slide space 37 from the slide face of the shell 30 toward the slide face of the photoelectric conversion module 50, and a thin-walled part 52" that is similarly recessed are respectively provided on the front and rear sides of the photoelectric conversion module 50 on the upper face of the pressing part 52. The recessed component 52' forms the corresponding pressure contact part 59 that can come into contact with the protruding component 31 provided to the shell 30. A corner part formed near the top of the vertical wall on the rear side, formed here using the recessed component 52', is used as the corresponding pressure contact part 59. When the photoelectric conversion module 50 slides in the slide space 37, the protruding component 31 of the shell 30 comes into contact with this corner part 59, this contact displaces the pressing part 52 of the photoelectric conversion module 50 from the shell 30 side to the photoelectric conversion module 50 side, and this presses the pressing part 52 into the positioning groove 56 of the main body part 51 in which the optical fiber is installed. The purpose of the thin-walled part 52" is to reduce the force required to insert the photoelectric conversion module 50 into the slide space 37.

Figure 10:
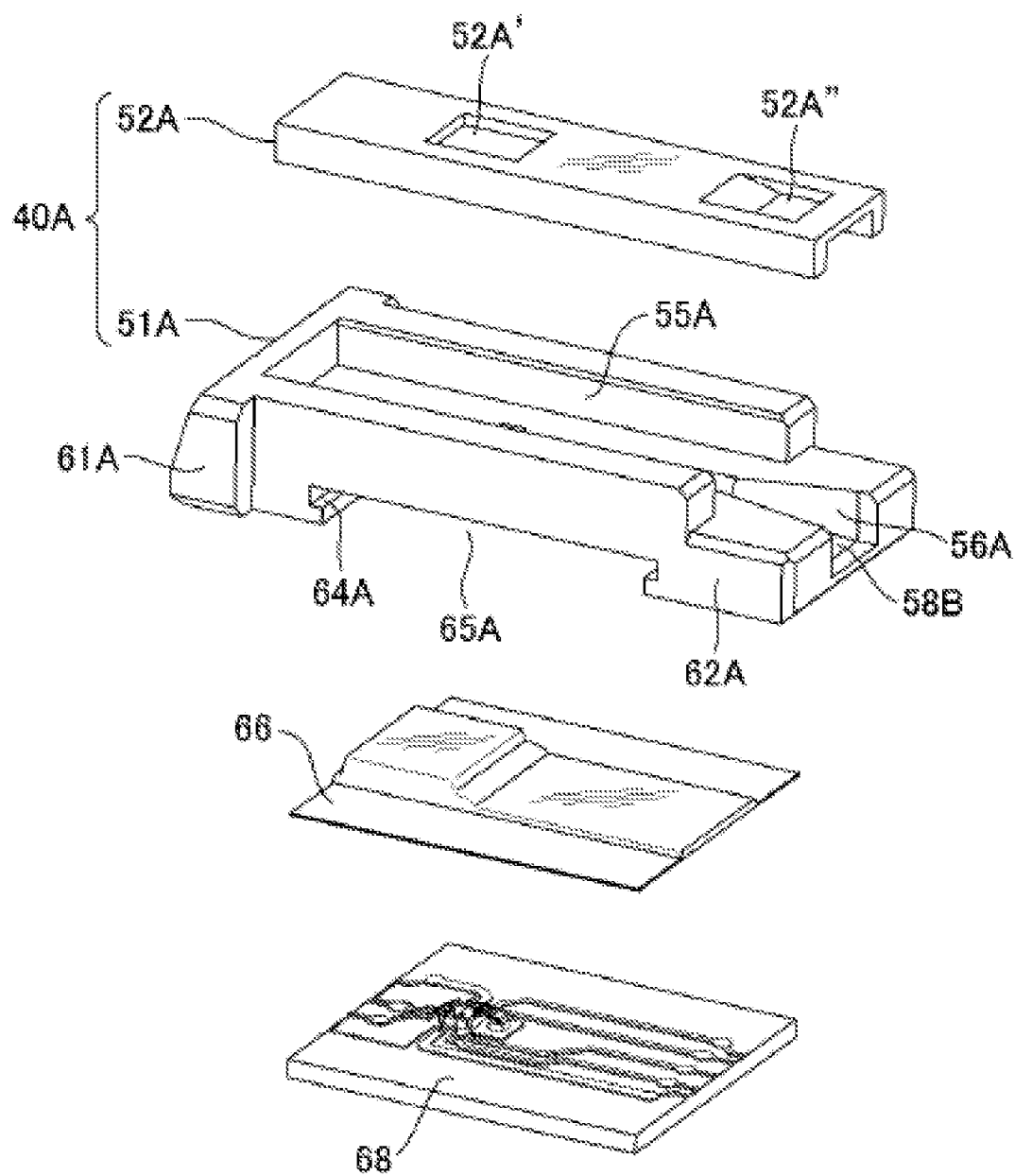
FIG. 10 A modification example of a photoelectric conversion module.

FIG. 10 shows a modification example of a photoelectric conversion module. As shown in the drawing, the main body part 51 and the pressing part 52 do not necessarily have to be linked, and may instead be separated from one another. In FIG. 10, those members that are the same as in FIG. 6, etc., have an "A" appended to their reference numbers.

<Fiber Holder>

Figure 11:
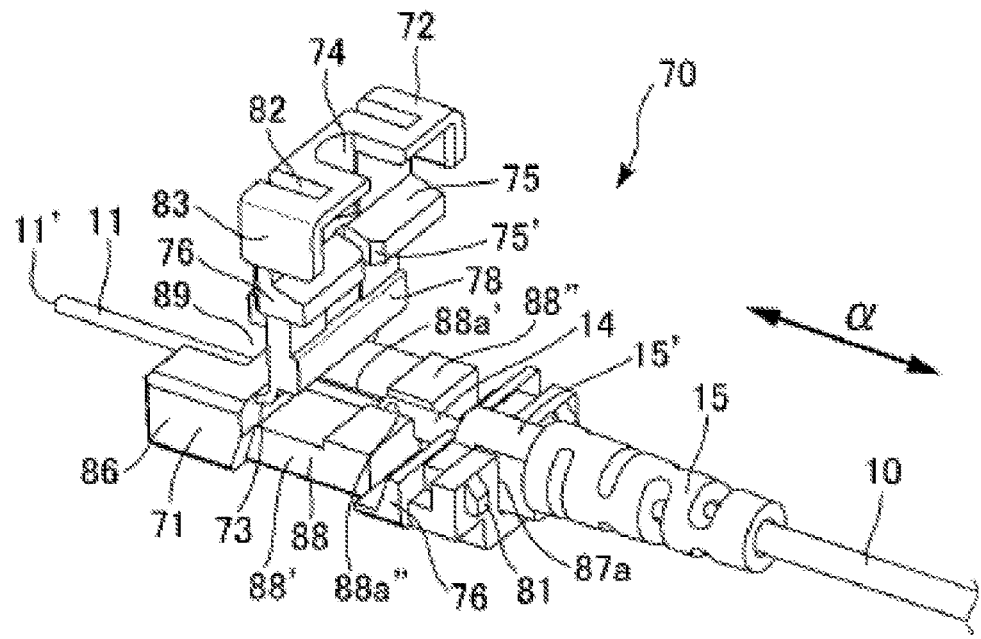
FIG. 11 Oblique views of a fiber holder.
Figure 11:
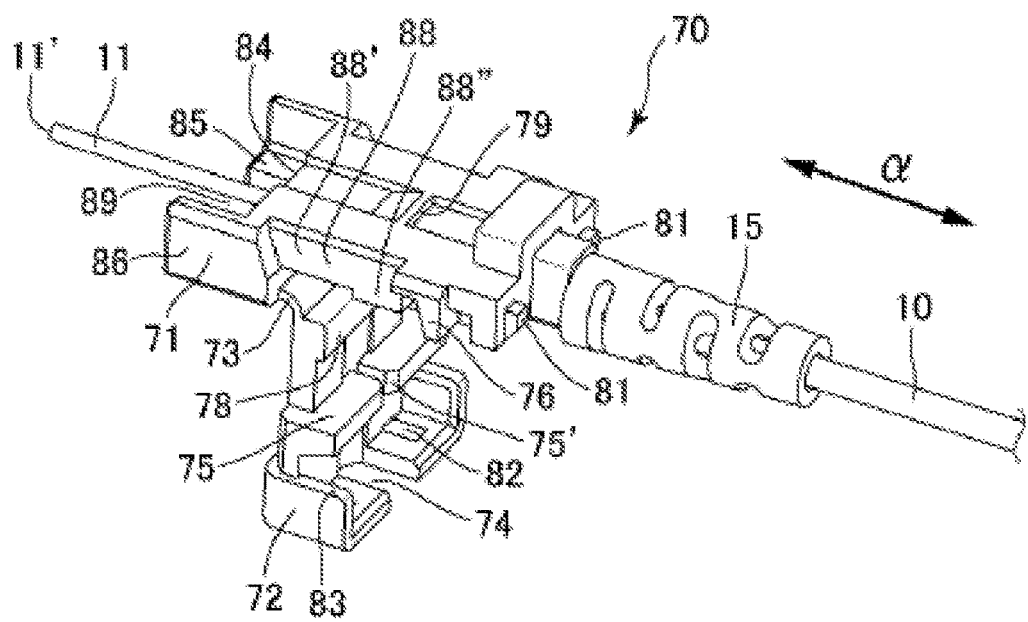

Like FIGS. 1 and 4, FIG. 11 is an oblique view of the fiber holder 70.

The fiber holder 70 has a front end part 86, a rear end part 87, and a middle part 88 that links these along the axial direction α.

Just the front end part 86 and the middle part 88 are inserted into the slide space 37 of the shell 30.

The side peripheral faces of the front end part 86 can form a housing space 85 that is open at the front and bottom faces, by means of the upper face and the left and right side faces (excluding the lower face), and an abutting face 84 on the front side of the fiber holder 70. This housing space 85 has a shape that is complementary to the rear end part 62 of the photoelectric conversion module 50. A cutout 89 that fits into the rear end side of the pressing part 52 of the housing 40 is provided in the middle part of the upper face.

The rear end part 87 and the middle part 88 (excluding the front end part 86) are divided in the up and down direction into a base 71 and a cover 72 that covers this base 71. To facilitate handling, the base 71 and the cover 72 are linked together by a hinge 73. The base 71 and the cover 72 can be assembled by rotating the cover 72 around the hinge 73 toward the base 71. During assembly, latching protrusions 81 provided to the back face of the base 71 are mated with latching recesses 82 provided to the back face of the cover 72, thereby latching the base 71 and the cover 72 together. Thus, with this embodiment, the optical fiber 10 can be mechanically attached merely by assembling the base 71 and the cover 72, without the use of an adhesive agent. Therefore, the task of attaching the optical fiber 10 can be made more efficient. The base 71 and the cover 72 do not necessarily have to be linked, and may instead be separated from one another.

The optical fiber 10 is installed in the fiber holder 70 in a state of passing through in the axial direction α. When the optical fiber 10 has been installed in the fiber holder 70, the core wire 11 mates with a groove 88a' in the base 71, provided in a thin-walled part 88' of the middle part 88, the cover 14 mates with a groove 88a" in the base 71, provided in a thick-walled part 88" of the middle part 88, and a boot 15 (and particularly its distal end portion 15') mates with a groove 87a provided to the rear end part 87.

After this, the optical fiber disposed in the grooves of the base 71 can be securely held in place between the base 71 and the cover 72 by attaching the cover 72 to the base 71 so that the base 71 is covered by the cover 72. More precisely, respectively held in place between the base 71 and the cover 72 are: the core wire 11 of the optical fiber 10 by a core wire holder 78 of the cover 72 provided to the opposite face from the base 71, a cover holder 75 by a groove 75' in the cover 72 provided to the opposite face from the base 71, and the boot 15 by a U-shaped boot holder 74 of the cover 72 provided to the opposite face from the base 71. The face of the core wire holder 78 opposite the base 71 is formed flat. Forming a flat part reduces the likelihood that the brittle core wire will be damaged.

Figure 12:
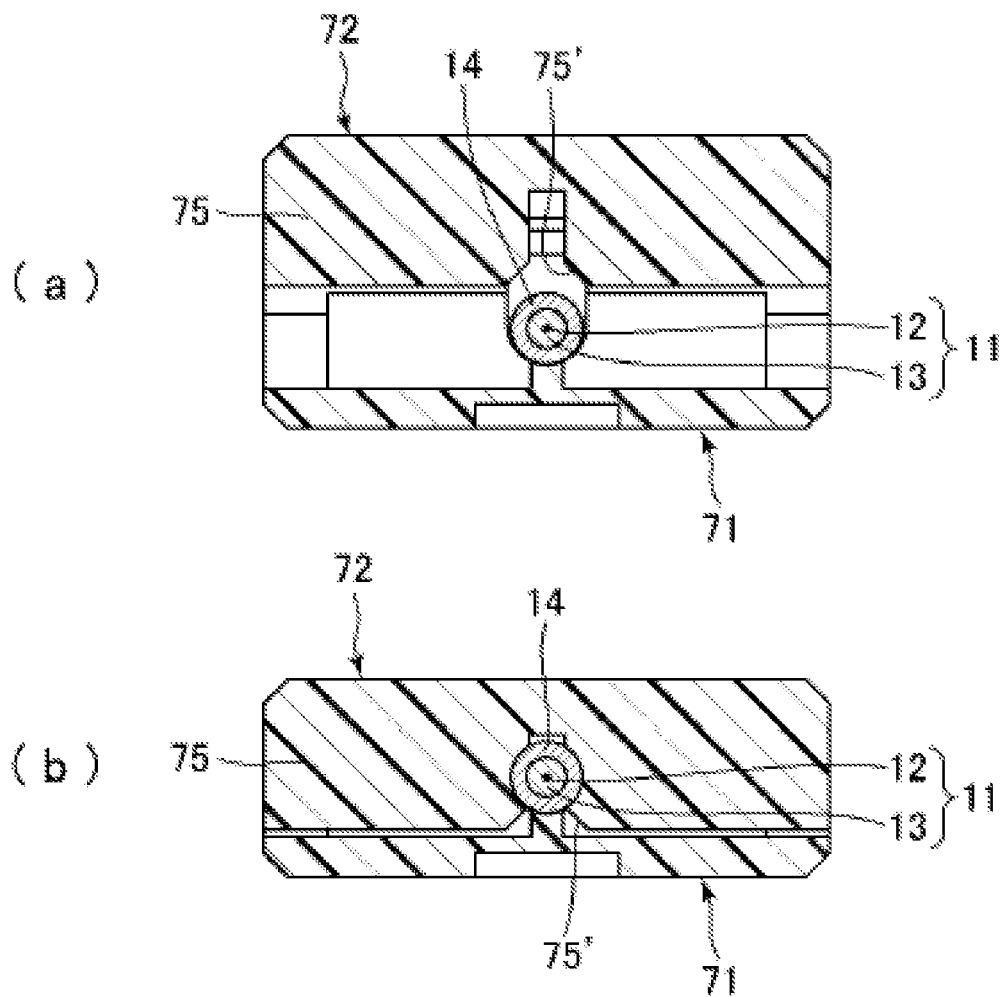
FIG. 12 Diagrams illustrating the holding mechanism in a cover holder.

The holding mechanism in the cover holder 75 will now be described in detail through reference to FIG. 12. FIG. 12 consists of cross sections along the A-A line in FIG. 4. FIG. 12a shows the state before the cover 72 has been completely attached to the base 71, and FIG. 12b shows the state after the cover 72 has been completely attached to the base 71. As is clear from these drawings, the cover holder 75 is securely held next to the base 71 by the groove 75' in the cover 72 provided to the face opposite the base 71. To ensure a secure hold, the groove 75' is a V groove 75' that widens on the side closer to the base 71. Forming the groove in this shape allows the V groove 75' to bite into the cover 14 of the optical fiber 10 as the cover 72 is moved closer to the base 71, so the cover 14 portion of the optical fiber 10 can be held more securely and smoothly. When the base 71 and the cover 72 are assembled, the cover holder 75 provided to the cover 72 meshes with a meshing component 76 (see FIG. 11) that is provided to the base 71 and has a shape which is complementary to the cover holder 75.

Figure 13:
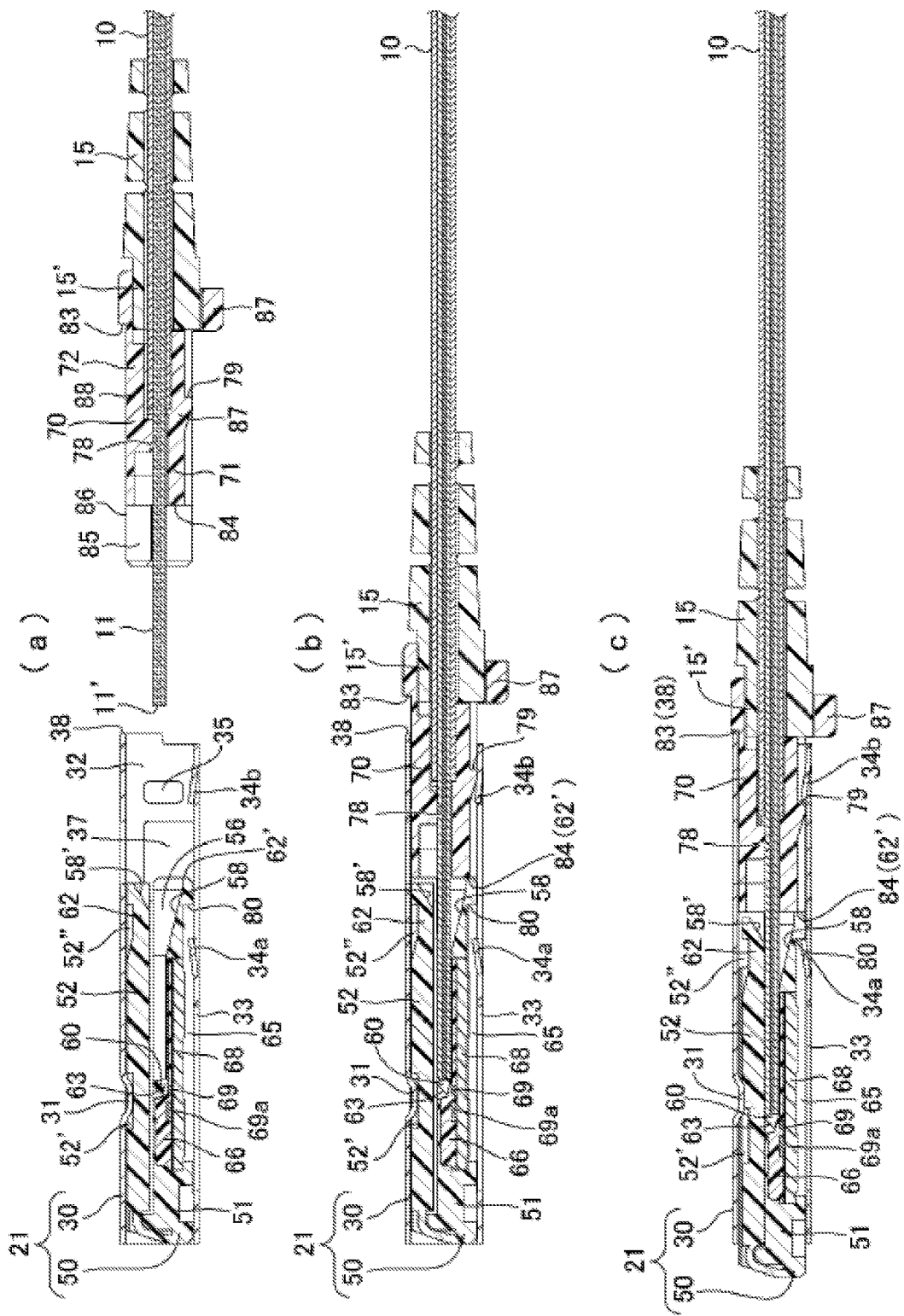
FIG. 13 Diagrams illustrating the task of attaching a fiber holder in a slide space.

FIG. 13 is a diagram illustrating the task of attaching the fiber holder 70 in the slide space 37 of the shell 30, and shows the photoelectric conversion connector 20 in a center cross section that is the same as in FIGS. 2 and 3. FIG. 13a shows the state before the fiber holder 70 is inserted into the slide space 37, FIG. 13b shows the initial state when the fiber holder 70 has been inserted into the slide space 37, and FIG. 13c shows the state when the fiber holder 70 has been completely inserted into the slide space 37.

As shown in FIG. 13a, in inserting the fiber holder 70 into the slide space 37, the optical fiber 10 is first held by the fiber holder 70, and the photoelectric conversion module 50 is inserted into the slide space 37 until the protruding component 31 provided to the upper wall of the shell 30 meshes lightly with the recessed component 52' provided to the upper face of the pressing part 52 of the photoelectric conversion module 50.

In this state, as shown in FIG. 13b, when the front end part 86 and the middle part 88 of the fiber holder 70 are inserted into the slide space 37, the core wire 11 of the optical fiber 10 held by the fiber holder 70 is inserted into and disposed in the installation component 56 provided between the main body part 51 and the pressing part 52, the rear end part 62 of the photoelectric conversion module 50 is fitted into the housing space 85 formed at the front end part 86 of the fiber holder 70, and the abutting face 84 on the front side of the fiber holder 70 butts up against the rear face 62' of the rear end part 62. At this point, the pressing part 52 is still floating above the main body part 51, so the insertion of the core wire 11 of the optical fiber 10 is not hindered by the pressing part 52, etc.

After this, the fiber holder 70 is inserted along with the photoelectric conversion module 50 further to the back of the slide space 37, through butting up against the abutting face 84 on the front side of the fiber holder 70 and the rear face 62' of the rear end part 62. How far the fiber holder 70 is inserted into the slide space 37 can be restricted by having a flange 83 provided to the front face of the rear end part 87 of the fiber holder 70 butt against the edge 38 at the rearmost position of the shell 30.

As shown in FIG. 13c, when the fiber holder 70 has been completely inserted into the slide space 37, the flange 83 of the rear end part 87 of the fiber holder 70 reaches the position where it butts up against the edge 38 of the shell 30, and the lances 36 provided to the left and right side walls of the shell 30 are butted up against the flanges 61' of the photoelectric conversion module 50. Also, the lance latching component 80 formed on the bottom face of the rear end part 62 of the photoelectric conversion module 50 is butted up against the free end 34a' of the lance 34a of the shell 30.

Furthermore, the lance latching component 79 formed on the bottom face of the fiber holder 70 is butted up against the free end 34b' of the lance 34b of the shell 30. In this state, the photoelectric conversion module 50 and the fiber holder 70 are fixed to the shell 30. To disengage the photoelectric conversion module 50 and the fiber holder 70, these lances should be unlatched.

Here, the corner part 59 formed by the recessed component 52' of the photoelectric conversion module 50 comes into contact with the pressure contact part 31, and this contact displaces part of the photoelectric conversion module 50 from the shell 30 side toward the installation component 56 on the photoelectric conversion module 50 side. The pressure contact part 31 rides up over the corner part 59 and presses on the corresponding pressure contact part 59 on the upper face of the pressing part 52. As a result, the pressing part 52 is pressed against the core wire 11 disposed in the installation component 56, so in this embodiment, the optical fiber 10, and more particularly the core wire 11, can be mechanically attached, without the use of an adhesive, merely by sliding the photoelectric conversion module 50 in the slide space 37. This makes the task of attaching the optical fiber 10 more efficient. Furthermore, since at least part of the cover 72 of the fiber holder 70 here, and particularly the front end part 86 and the middle part 88, are housed in the slide space 37 of the shell 30, the walls of the shell 30 constituting the slide space 37 can also be used as a retainer for the cover 72.

Figure 14:
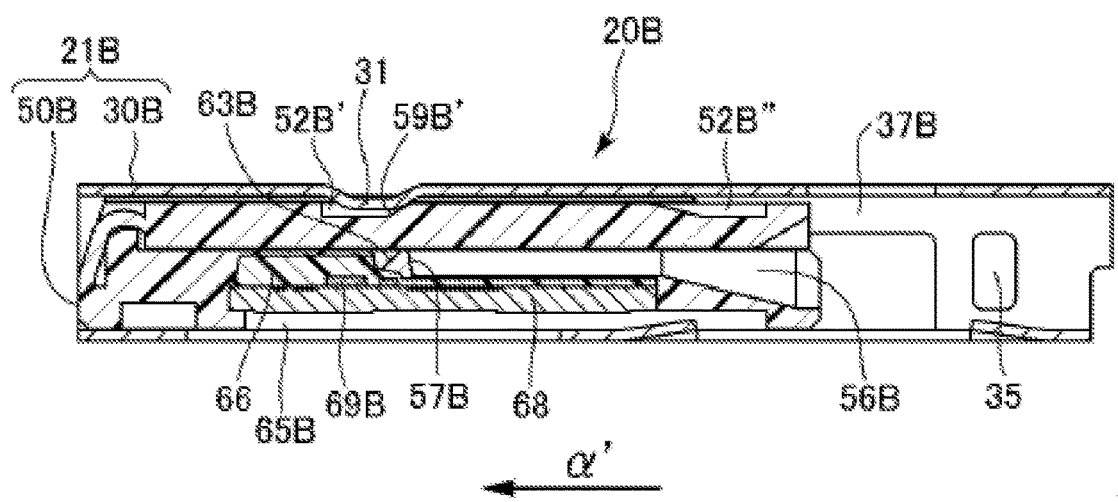
FIG. 14 A modification example of the method for bringing a contact part into contact with a corresponding contact part.

FIG. 14 shows a modification example of the method for bringing a contact part into contact with a corresponding contact part. Here, a sloped face 593, designed so that the contact face becomes more gentle along the slide direction α' of a photoelectric conversion module 50B in a slide space 37B, is provided as a corner part 59B' in order to be a corresponding pressure contact part formed by utilizing a recessed component 52B', that is, the contact face with the pressure contact part 31. Providing this sloped face 59B' reduces the load exerted when the photoelectric conversion module 50B is slid in the slide space 37B.

Figure 15:
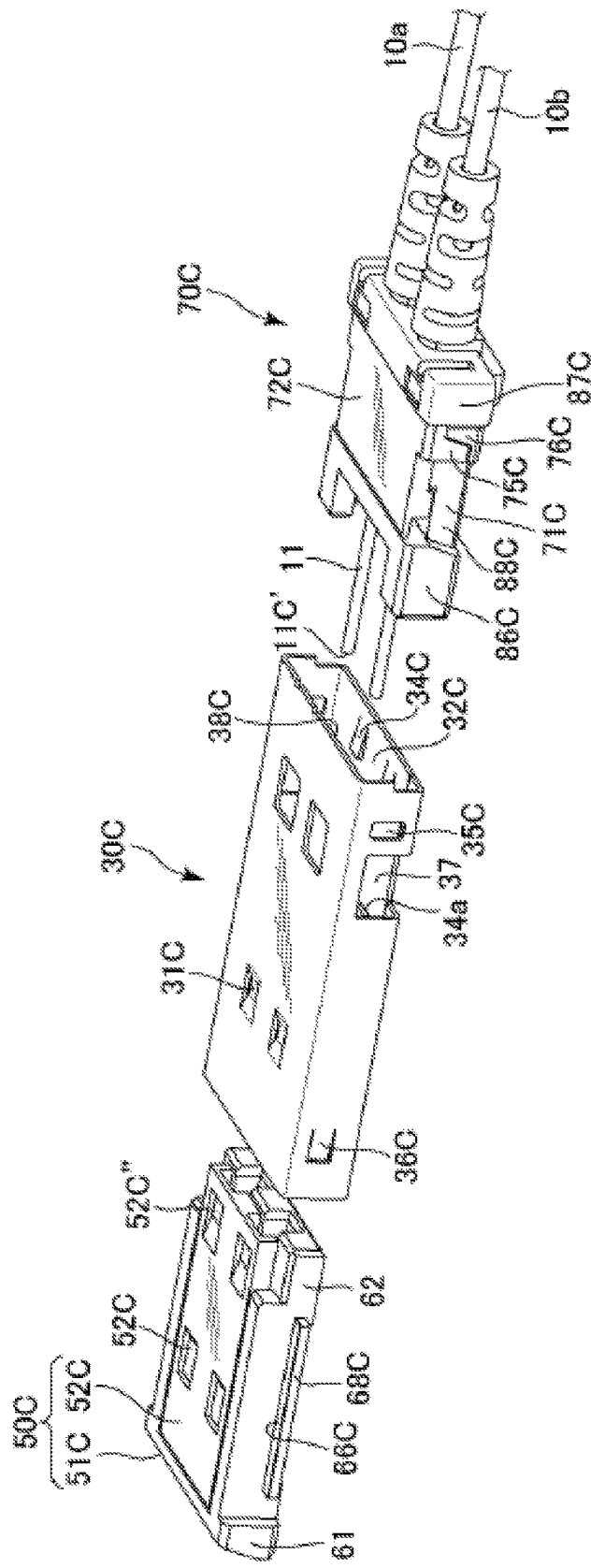
FIG. 15 An exploded oblique view of a photoelectric conversion connector pertaining to another embodiment.
Figure 16:
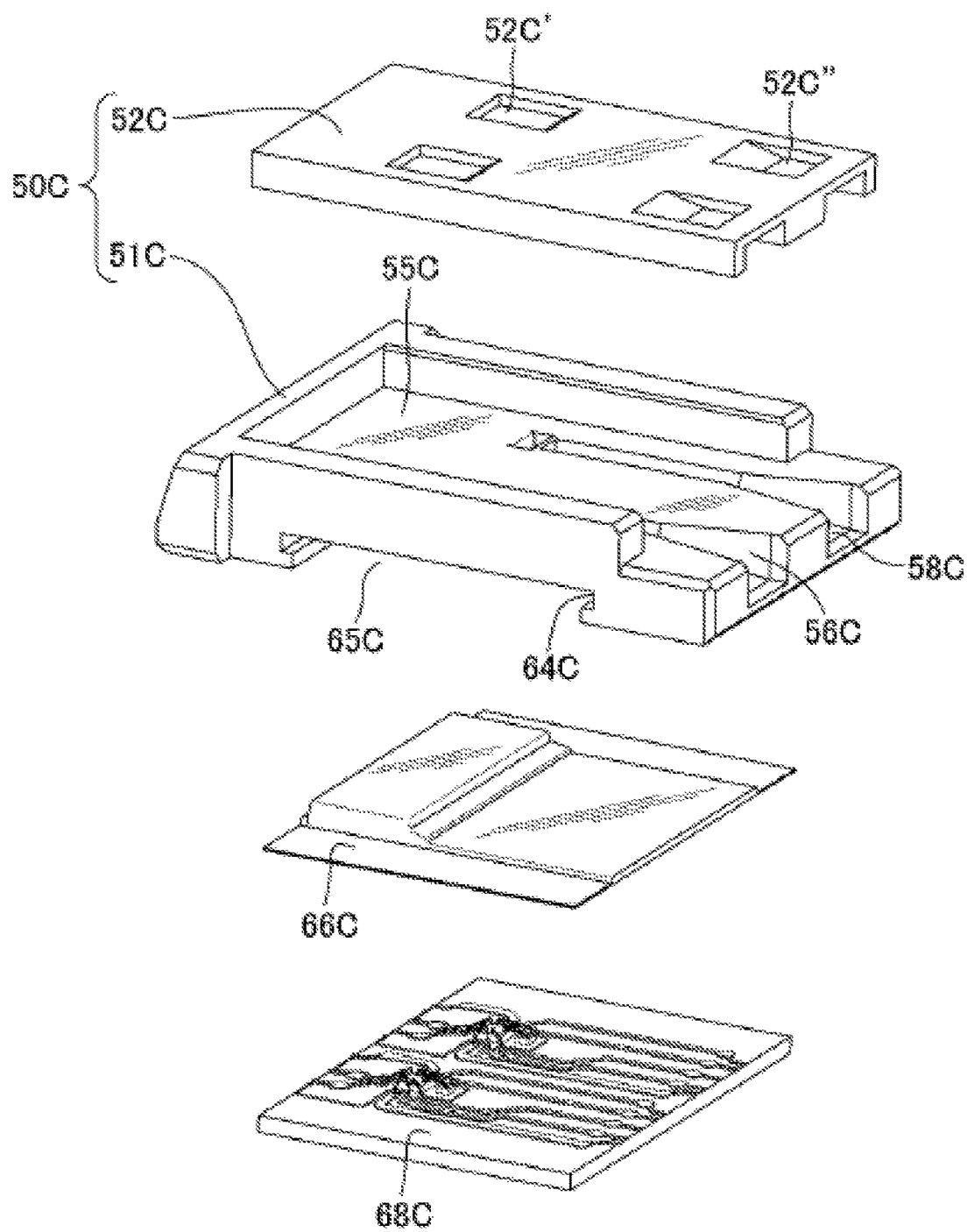
FIG. 16 An exploded oblique view of the photoelectric conversion module shown in FIG. 15.

FIGS. 15 and 16 show another embodiment. FIG. 15 is an exploded oblique view of a photoelectric conversion connector corresponding to FIG. 4. FIG. 16 is an exploded oblique view of a photoelectric conversion module corresponding to FIG. 7. In this embodiment, the photoelectric conversion connector shown in FIG. 1, etc., is widened so that two optical fibers 10a and 10b can be arranged in two rows in the width direction. These two optical fibers 10a and 10b may be such that one is used for transmission and one for reception, or both may be used for transmission, or both for reception. The basic structure here is the same as in the previous embodiment shown in FIG. 1, etc. Therefore, these parts will not be described again in detail. In FIGS. 15 and 16, those members that are the same as in the embodiment in FIG. 1, etc., have a "C" appended to their reference numbers.

As is clear, the present invention is not limited to or by the above embodiment, and various modifications are possible.

For instance, in the above embodiment the core wire was held in the installation component, but the covering or boot besides the core wire can also be held by using the same principle.

Also, in the above embodiment, the pressure contact part 31 was formed by utilizing the protruding component 31 that protruded from the slide face of the shell 30 in the slide space 37 toward the slide face of the photoelectric conversion module 50, while the corresponding pressure contact part 59 was formed by utilizing the recessed component 52' that was recessed from the slide face of the shell 30 in the slide space 37 toward the slide face of the photoelectric conversion module 50, but conversely, the pressure contact part may be formed by utilizing a recessed component that is recessed from the slide face of the photoelectric conversion module 50 in the slide space 37 toward the slide face of the shell 30, while the corresponding pressure contact part is formed by utilizing a protruding component that protrudes from the slide face of the photoelectric conversion module 50 in the slide space 37 toward the slide face of the slide receptacle 30.

Furthermore, the support 68 on which the photoelectric conversion element 69 is mounted may be not only an ordinary substrate, but also a lead frame. In the case of a lead frame, the frame is formed so as to be a connector contact in a later step. Also, in the above embodiment, lances were used to fix the photoelectric conversion module 50 to the shell 30, but this is not the only option, and instead a protruding component (not shown) that protrudes to the photoelectric conversion module 50 side may be provided to part of the shell 30, and this protruding component may be fitted into a hole (not shown) provided to the shell 30 to fix these together.

Also, part of the shell may be bent and a wall provided that butts up against part of the photoelectric conversion module 50 to fix these together.

In these cases, rather that serving to fix, the lances function as means for restricting the amount of slide of the photoelectric conversion module 50 with respect to the shell 30.

Thus, the embodiments disclosed in this Specification are merely illustrative in nature, and not limiting, and the scope of the present invention should be determined by the Claims, rather than by the above Specification, and all modifications within the meaning and range of equivalency of the claims are included.

FIELD OF INDUSTRIAL UTILIZATION

The present invention can be widely used in situations where an optical fiber needs to be attached.

BRIEF DESCRIPTION OF THE DRAWINGS 1 photoelectric conversion device
10 optical fiber
11 core wire
11' distal end
20 photoelectric conversion connector (optical fiber attachment device)
21 device main body
30 shell (slide receptacle)
31 protruding component
37 space (slide space)
50 photoelectric conversion module (sliding member)
51 main body part
52 pressing part
52' recessed component
56 positioning groove (installation component)
59 corresponding pressure contact part (right angle edge)
59C' sloped face
60 reflector
63 mirror
66 resin member
68 support
69 photoelectric conversion element
70 fiber holder
71 base 72 cover
73 hinge
75' V groove
78 core wire holder
90 electrical connector (mating connector)

The invention claimed is:

1. An optical fiber attachment device, comprising:
   a slide receptacle having a slide space; and
     a sliding member provided slidably in the slide space;
     wherein the sliding member has an installation component where a core wire of an optical fiber is installed,
     a pressure contact part is provided to a slide face of the slide receptacle in the slide space, and a corresponding pressure contact part is provided to a slide face of the sliding member in the slide space, wherein the corresponding pressure contact is on at least a portion of the slide face of the sliding member that is attached to the sliding member by a hinge and is folded over the installation component, and
     when the sliding member has slid in the slide space, the pressing force of the pressure contact part propagates through the corresponding pressure contact part to the slide face of the sliding member, and part of the sliding member is pressed from the slide face of the slide receptacle onto the slide face of the sliding member toward the installation component.

2. The optical fiber attachment device according to claim 1, wherein the pressure contact part is formed by utilizing a protruding component that protrudes from the slide face of the slide receptacle in the slide space toward the slide face of the sliding member, and the corresponding pressure contact part is formed by utilizing a recessed component that is recessed from the slide face of the slide receptacle in the slide space toward the slide face of the sliding member, or
   the pressure contact part is formed by utilizing a recessed component that is recessed from the slide face of the sliding member in the slide space toward the slide face of the slide receptacle, and the corresponding pressure contact part is formed by utilizing a protruding component that protrudes from the slide face of the sliding member in the slide space toward the slide face of the slide receptacle.

3. The optical fiber attachment device according to claim 2, wherein a sloped face is provided to the contact face of the protruding component and the recessed component of the protruding component and/or the recessed component in order to make said contact face more gentle.

4. The optical fiber attachment device according to claim 1, wherein the sliding member has a main body part and a pressing part provided in a movable state to said main body part, and the installation component is provided between the main body part and the pressing part.

5. The optical fiber attachment device according to claim 4, wherein the main body part and the pressing part are linked together or are separated from one another.

6. The optical fiber attachment device according to claim 1, wherein the slide receptacle is in the form of a tube with or without a bottom.

7. The optical fiber attachment device according to claim 1, wherein the slide receptacle is a metal shell.

8. The optical fiber attachment device according to claim 1, wherein a fiber holder has a base and a cover that covers the base, and
   a core wire holder that holds the core wire of the optical fiber between the base and the cover, and,
   a cover holder that holds the cover of the fiber holder including the core wire are provided along the axial direction of the optical fiber between the base and the cover.

9. The optical fiber attachment device according to claim 8, wherein the base and the cover are linked together or are separated from one another.

10. The optical fiber attachment device according to claim 8, wherein the cover holder is provided on the face of the cover opposite the base, and includes a V groove that widens on the side closer to the base.

11. The optical fiber attachment device according to claim 8, wherein the core wire holder includes a flat part provided on the face of the cover opposite the base.

12. The optical fiber attachment device according to claim 8, wherein at least part of the cover is housed in the slide space of the slide receptacle.

* * * * *